United States Patent [19]

Staggers

[11] 4,018,597
[45] Apr. 19, 1977

[54] RARE EARTH METAL SILICIDE ALLOYS
[75] Inventor: John O. Staggers, Downington, Pa.
[73] Assignee: Foote Mineral Company, Exton, Pa.
[22] Filed: Aug. 5, 1975
[21] Appl. No.: 602,081
[52] U.S. Cl. .................................. 75/58; 75/129; 75/134 F; 75/134 S
[51] Int. Cl.² .................. C21C 7/00; C22C 33/04; C22C 38/00
[58] Field of Search ............... 75/58, 130 R, 134 S, 75/152, 134 F, 129

[56] References Cited

UNITED STATES PATENTS

| | | | |
|---|---|---|---|
| 3,211,549 | 10/1965 | Kusaka | 75/134 S |
| 3,295,963 | 1/1967 | Galvin | 75/152 |
| 3,364,015 | 1/1968 | Sump | 75/134 S |
| 3,383,202 | 5/1968 | Lynch | 75/134 S |
| 3,440,040 | 4/1969 | Kallenbach | 75/152 |

OTHER PUBLICATIONS

T. B. Reed, "Free Energy of Formation of Binary Compounds", (M.I.T. 1971).

Primary Examiner—Peter D. Rosenberg
Attorney, Agent, or Firm—Howson and Howson

[57] ABSTRACT

Rare earth metal silicide alloys comprising about 25 to about 40% rare earth metals, about 35 to about 50% Si, about 5 to about 25% Fe, about 2 to about 8% Ca, about 2 to about 4% Ba and about 1 to about 3% Sr, the proportions based on the weight of the alloy are disclosed. Also disclosed is a method of making rare earth metal silicide alloys and a method of treating high strength-low alloy steel with the rare earth metal silicide alloys of the invention.

8 Claims, No Drawings

RARE EARTH METAL SILICIDE ALLOYS

BACKGROUND OF THE INVENTION

Rare earth metals and rare earth metal alloys have found use in ferrous metallurgy, particularly in the treatment of steel, where they accomplish deoxidation, desulfurization and modification of inclusions in steel. Treatment with rare earth metals and rare earth metal alloys results in increased hardness and impact strength and improved ductility and weldability of steel.

There is a present need for substantial quantities of high strength, low alloy (HSLA) steels. HSLA steels are used to form line pipe and in automotive applications, uses which place stringent controls on transverse impact toughness and formability of the steel.

It is well known that manganese sulfide inclusions form during the production of HSLA steels and that these inclusions play a detrimental role in reducing the transverse properties of rolled HSLA steel. That is, the inclusions, which are somewhat plastic in nature, elongate or string out during rolling producing areas of reduced strength (anisotropy) where manganese sulfide stringers form. The anisotropic properties are undesirable, of course, since line pipe or other articles made from HSLA steel may fail during use precisely in the areas of reduced strength.

Various agents, including rare earth metals, misch metal and rare earth metal alloys have been used to treat HSLA steels in an attempt to modify both the chemistry and shape of manganese sulfide inclusions and to aid in deoxidation and desulfurization of the steel. It is an object of this invention to provide improved rare earth metal silicide alloys useful for treatment of HSLA steels. A futher object of the invention is to provide a method for producing improved rare earth metal silicide alloys.

DESCRIPTION OF THE INVENTION

The invention relates to rare earth metal silicide alloys comprising about 25 to about 40% rare earth metals, about 35 to about 50% Si, about 5 to about 25% Fe, about 2 to about 8% Ca, about 2 to about 4% Ba and about 1 to about 3% Sr, the proportions based on the weight of the alloy. The invention also relates to a method for the production of rare earth metal silicide alloys which comprises carbothermically reducing agglomerated rare earth metal compounds, silica and iron at a temperature in excess 3500° F. and a method for the treatment of HSLA steels with the rare earth metal silicide alloys of this invention.

Generally, the term "rare earth metal" identifies the elements of the lanthanide series having atomic numbers 57 to 71, although the element yttrium (at no. 39) is commonly found with and included in this group of metals. Cerium is the most plentiful of these metals. The term "rare earth metal" will have the foregoing meaning in the present specification and claims.

The rare earth metal compounds which can be used to produce the desired rare earth metal silicide alloys of the present invention include rare earth metal oxides, carbonates, phosphates, silicates, and fluorocarbonates. Compounds in the form of ores or ore concentrates of the rare earth metals can be used as well as relatively pure materials such as cerium oxide. Useful sources of rare earth metals are the monazite and bastnasite deposits of the Western United States, particularly the latter. Commercially available bastnasite concentrates, particularly those emanating from California deposits, contain at least about 55 to 60% and up to as much as 85 to 90% rare earth metal oxides, and about 10 to 15% of other metal oxides including calcium, barium and strontium oxides. The rare earth metal silicide alloys of this invention comprise from about 25 to about 40% rare earth metals, about 35 to about 50% Si, about 5 to 25% Fe, about 2 to about 8% Ca, about 2 to about 4% Ba, and about 1 to about 3% Sr, the proportions based on the weight of the alloy. A particulrly preferred rare earth metal silicide alloy of this invention comprises about 32.5% rare earth metals, about 42.5% Si, about 15% Fe, about 5% Ca, about 3% Ba and about 2% Sr, the proportions based on the weight of the alloy. The ratio of rare earth metals to alkaline earth metals in the rare earth metal silicide alloys will in general, be about 3:1 to about 4:1.

The rare earth silicide alloys of this invention are particularly useful to manufacturers of HSLA steels. HSLA steels are highly deoxidized steels containing, on average about 1.5% Mn, about 0.15 to 0.25% Si, about 0.010 to 0.02% S, about 0.04% of Al, about 0.06% vanadium, about 0.03% columbium, balance Fe. Such steels contain manganese sulfide inclusions. These inclusions play a detrimental role in reducing transverse properties of rolled steel, because the inclusions elongate forming manganese sulfide stringers during rolling of the steel. The deformability or plasticity of manganese sulfide inclusions depends on the ratio of manganese to sulfur in HSLA steel, the higher the ratio the more plastic the sulfide. The oxygen content of the steel also influences the properties of the inclusions, with lower oxygen contents in killed steel producing more plastic sulfides.

The rare earth metal silicide alloy of this invention are particularly useful in the treatment of HSLA steels. They are effective to decrease the level of sulfur in the treated steel. They also modify manganese sulfide inclusions, rendering them more refractory in nature so that the inclusions remain in globular form on rolling thereby reducing or eliminating anisotropic properties. At the same time, treatment with the alloys of this invention produces HSLA steel containing, on average, less than 100 ppm oxygen.

HSLA steels treated with rare earth metals or rare earth metal alloys known heretofore have been known to show a drop in sulfur up to about 25% of the total amount in the untreated HSLA steel. The drop in sulfur content occurs as the result of the formation of rare earth metal sulfides. Rare earth metal sulfides are dense globular bodies which tend to remain in the treated steel. HSLA steels treated with the rare earth silicide alloys of this invention show a reduction in sulfur of from 25 to 50%, based on the amount of sulfur in untreated steel. It is theorized that this remarkable reduction in sulfur content may result from the formation of rare earth metal sulfides and oxysulfides contaning calcium, barium and strontium compounds. The calcium, barium and strontium containing rare earth metal sulfides and oxysulfides are lower melting and far less dense than rare earth metal sulfides and oxysulfides produced in treatment with conventional rare earth metal alloys, thus, they rise up out of molten metal to enter the slag phase produced on treatment of HSLA steels. In addition, the rear earth metal silicide alloys of this invention modify manganese sulfide inclusions present in HSLA steels forming higly refractory rare earth metal-calcium oxysulfides. These refractory inclusions, while remaining in the HSLA steel, are not plastic, and do not string out on rolling to produce undesired anisotropic properties. HSLA steels are also deoxidized when treated with the rare earth metal silicide alloys of this invention.

In summary, treatment of HSLA steel with rare earth metal silicide alloys of this invention results in a modification of highly plastic and non-refractory manganese sulfide inclusions to refractory rare earth metal-calcium oxysulfide inclusions while at the same time dramatically decreasing the sulfur and oxygen content of the treated HSLA steel. Also, room temperature transverse charpy impact valves of HSLA steels treated with the rare earth metal silicide alloys of this invention are substantially higher than the values for HSLA steels treated with rare earth metal silicide alloys known heretofore.

The producer of HSLA steels may determine the amount of rare earth metal silicide alloys required for treatment of HSLA steels by evaluating the sulfur content of the HSLA steel undergoing treatment and calculating the amount of alloy needed for treatment based on this value. In practice, it is known that HSLA steel analyzing about 0.025% sulfur contains about ½ pound of sulfur per ton of molten steel. Use of sufficient rare earth metal silicide alloys to produce a HSLA steel having a residual cerium (rare earth metal) to sulfur ratio of about 1, provides HSLA steel with the properties described herein.

It has been established that the rare earth metal silicide alloys of this invention are almost twice as effective, on a pound per ton treatment basis, as conventional rare earth metal silicide alloys in converting low melting, stringer type manganese sulfide inclusions in HSLA steels to refractory globular inclusions which do not elongate at steel rolling temperatures. In addition to the desired effects on HSLA steel with the rare earth metal silicide alloys of this invention, the new alloys offer economy to the steel producer since substantially less alloy on a weight basis is required to achieve the desired results than is possible with conventional rare earth metal silicide alloys. Also of interest to the steel manufacturer is the fact that less silicon is introduced into the treated steel than is the case with treatment with conventional rare earth metal silicide alloys since less alloy is required in the treatment process.

The rare earth metal silicide alloys of this invention may be used to treat HSLA steel in any conventional form such as powder or lump, normally 1½ by down. The rare earth metal silicide alloys may be added to molten HSLA steel using a refractory bell to submerge the alloy under the surface of molten steel or by injecting the powdery alloy into the steel with the aid of an inert gas. In addition, the alloy may be placed in the base of a ladle or mold to which molten HSLA steel is then added.

The carbothermic reduction process of the present invention makes use of carbon to extract metal values from rare earth metal compounds according to the reaction:

metal oxide + carbon → metal + CO

Temperatures in excess of about 3500° F. are required for the reduction process, hence the procedure may be carried out in a submerged arc furnace using carbon electrodes. The process of this invention may be characterized as a method for producing rare earth metal silicide alloys which comprises carbothermically reducing agglomerated rare earth metal compounds, silica and iron at temperatures in excess of about 3500° F. in which said components are combined so that the resultant rare earth metal silicide alloys comprise about 25 to about 40% rare earth metals, about 35 to about 50% Si, about 5 to about 25% Fe, about 2 to about 8% Ca. about 2 to about 4% Ba and about 1 to about 3% Sr, the proportions based on the weight of the alloys, the ratio of silica to iron present in the reduction process being from about 8:1 to about 12:1, and the amount of carbon present in the reduction process being in excess of the stoichiometric quantity required for reduction of both the rare earth metal oxides and other metal oxides in the rare earth metal compounds and the silicon present in the reduction process. In a preferred embodiment, the components are combined so as to produce as rare earth metal silicide alloy comprising about 32.5% rare earth metals, about 42.5% Si, about 15% Fe, about 5% Ca, about 3%Ba and about 2% Sr. As will be explained in detail hereinafter, the ratio of silica to iron and the amount of carbon used in the present process is of importance and should be controlled carefully.

The present process, as described above, results in the reduction of rare earth metal oxides and alkaline earth metal oxides, i.e. calcium, barium and strontium oxides present in rare earth metal compounds such as bastnasite, to their corresponding silicides. As may be expected, additional sources of alkaline earth metals, such as alkaline earth metal carbonates or oxides may be added to the carbothermic reduction process to insure that the rare earth metal silicide alloys produced have the desired composition. That is, should a particular rare earth metal compound used to prepare the rare earth metal silicide alloys of this invention contain insufficient calcium, barium or strontium oxides to produce an alloy having the desired content of the silicides of those metals, a quantity of the oxides, carbonates or other sources of those metals may be included in the carbothermic reduction process. Limestone, in lump or powder form, may be used as a convenient source of additional calcium oxide, if necessary.

Commercially available rare earth metal compounds are in the form of very fine powders which are difficult to add to a reduction furnace without loss of valuable metal values due to dusting. Therefore, it is desirable to agglomerate the fine rare earth metal compounds prior to the carbothermic reduction. Loss of metal values is controlled and eliminated through the expediency of agglomerating the powdery material with the aid of a binder material and conventional apparatus. For example, rare earth metal compounds and any other powdery material to be included in the furnace charge, such as additional sources of alkaline earth metals, may be mixed with a liquid binder and formed into pellets of any convenient size and shape. A pelletized mixture of commercially available bastnasite (California type), containing up to about 15%, preferably about 10% barium carbonate and up to about 10% preferably about 5% strontium carbonate, the proportions based on the weight of the mixture, is particularly useful for preparing the rare earth metal silicide alloys of this invention.

Silica, carbon and iron required for the carbothermic reduction process may be supplied in any conventional form. For example, sand or quartz may serve as a source of silica. Carbon may be supplied as coal, wood chips, coke or combinations of several carbonaceous materials. Iron, for economic reasons, is supplied in the form of steel scrap, although any source of iron could be used in the process.

Considering the foregoing in greater detail, it has now been discovered that carbothermic reduction of rare earth metal compounds, i.e. bastnasite, in which the ratio of silica to iron present in the reduction process is from about 8 to 1 to about 12 to 1, preferably about 10:1, and the amount of carbon present in the reduction process is in excess of the stoichiometric quantity required for reduction of both the rare earth metal oxides and other metal oxides found in the rare earth metal compounds and the silica present in the reduction process will produce the rare earth metal silicide alloys of the invention. The precise quantity of carbon required for the carbothermic reduction process will vary depending on specific furnace conditions employed in the reduction process and may vary from about 10 to about 35% and even as much as 50% in excess of the stoichiometric amount required for the reduction process.

Carbothermic reduction of rare earth metal compounds with an amount of carbon in excess of the stoichiometric amount required for the reduction process serves to secure substantially complete reduction of the silica used in the reduction process. This has two beneficial effects; one, since silicon favors the production of rare earth metal silicides rather than rare earth metal carbides, the formation of rare earth metal carbides is suppressed. Secondly, the presence of silicon in the reduction process favors the formation of calcium, barium and strontium silicides. This latter effect is important because calcium, barium and strontium oxides typically present in rare earth metal compounds have not been reduced in conventional reduction procedures but have remained in their oxide form and have been lost to the slag phase of the reduction process.

It is also surprising to find that silicon developed in situ through carbothermic reduction of silica in accord with the present invention is effective to bring about reduction of calcium, barium and strontium oxides present in the rare earth metal compounds whereas previously known reduction procedures using a stoichiometric excess of silica or including calcium silicide did not achieve reduction of calcium, barium and strontium oxides present in rare earth metal compounds to their corresponding silicides.

The ratio of silica to iron present in the reduction process is, as noted above, from about 8:1 to about 12:1, preferably about 10:1. This is in contrast to previous methods for producing rare earth metal silicide alloys wherein substantially more iron in relation to silica has been used in the reduction process. It is theorized that the combined effect of the relative increase in amount of silicon and decrease in amount of iron in the carbothermic reduction process leads to the recovery of substantial levels of alkaline earth metals present in the rare earth metal compounds making it possible to produce alloys containing silicides of the rare earth metals and the alkaline earth metals present in the rare earth metal compounds used in the process. The decreased level of iron in the present carbothermic reduction process is thought, for example, to enhance the reduction of calcium, barium and strontium oxides contained in rare earth metal compounds because the solubility of the alkaline earth metals (calcium, barium and strontium) increases in inverse proportion to the amount of iron present in the reduction process.

The invention will be further described by the following illustrative example.

EXAMPLE 1

One thousand pounds of bastnasite concentrate analyzing about 88% rare earth metal oxides (47% $CeO_2$, 24% $La_2O_3$, 12% $Nd_2O_3$, bal. mixed rare earth metal oxides) and containing about 12% alkaline earth metal oxides (8% SrO, 3% CaO, 1% BaO), 100 lbs. $BaCO_3$ and 50 lbs. $SrCO_3$ were blended with about 9.7% by weight of a 1:1 water/Goulac binder, pelletized and dried at 250° F. The bastnasite pellets were used to produce a rare earth metal silicide alloy by adding the following mix to a submerged arc furnace operating at 125 transformer volts, 8000–8500 KW load:

|  | lbs. |
|---|---|
| Bastnasite pellets | 480 |
| Quartzite (4" × 1") | 500 |
| Limestone (4" × 2") | 100 |
| Steel Scrap | 50 |
| Low Ash Coal (2" × ⅛") | 390 |
| Wood Chips | 400 |
| (Carbon Theory,%-128.8) | |

Electrode penetration was from about 45 inches at the start to about 65 inches at the end of the process. Furnace top conditions were good, with no evidence of slag and there was complete freedom from blows which might have been expected from the presence of Ca, Ba and Sr in the alloy. The absence of blows indicates these normally volatile elements were present as stable silicides, a condition made possible by the low (20%) iron content of the alloy. The alloy produced using this mix analyzed:

| Si | Rare Earth Metal | Ba | Ca | Sr | Fe |
|---|---|---|---|---|---|
| 39.7 | 31.2 | 2.3 | 4.5 | 2 | 18.8 |

The rare earth metal silicide alloy was used to treat HSLA steel in a series of heats with the results indicated in Table IA (Heats 1–6). Also set forth in Table IA are the results of comparative tests (Heats 7–10) wherein rare earth metal silicide alloys analyzing 30–35% rare earth metals, 30–35% Si and 30–35% Fe prepared in accordance with conventional practice were used to treat HSLA steel in the same manner as in Heats 1–6. The results show that the rare earth metal silicide alloys of this invention are about twice as effective on a pound/ton basis as conventional rare earth metal silicide alloys in removing sulfur from HSLA steels; compare Heats 1 and 7 and 3 and 9 for example.

Further comparative tests were conducted in the manner set forth above, in which rare earth metal silicide alloys of this invention (Heats 11–15) and rare earth metal silicide alloys analyzing 30–35% rare earth metals, 30–35% Si and 30–35% Fe prepared in accordance with conventional practice (Heats 16–20) were compared in the treatment of HSLA steel. The results of these comparative tests, also set forth in Table 1B, establish that the rare earth metal silicide alloys of this invention are substantially more effective on a pound/- ton basis as conventional rare earth metal silicide alloys in removing sulfur from HSLA steels; compare Heats 13 and 20 and 14 and 18, for example.

TABLE I A

| Heat Number | Heat Weight (lbs) | Alloy Addition Rate (lbs/ton) | Ce in Ingot (%) | Ce Recovered (%) | S Before Addition (%) | S in Ingot (%) | S Decrease (%) | Total Change in S (%) |
| --- | --- | --- | --- | --- | --- | --- | --- | --- |
| 1 | 1000 | 10 | .030 | 32 | .017 | .008 | .009 | 52.94 |
| 2 | 1000 | 10 | .034 | 36 | .019 | .011 | .008 | 42.11 |
| 3 | 1000 | 8 | .024 | 32 | .017 | .008 | .009 | 52.94 |
| 4 | 1000 | 8 | .013 | 17 | .018 | .011 | .007 | 38.89 |
| 5 | 1000 | 6 | .024 | 42 | .017 | .012 | .005 | 29.41 |
| 6 | 1000 | 4 | .021 | 55 | .017 | .017 | 0 | 0 |
| COMPARATIVE HEATS | | | | | | | | |
| 7 | 1000 | 10 | .050 | 59 | .016 | .014–.016 | 0–.002 | 0–12.50 |
| 8 | 1000 | 10 | .040 | 47 | .018 | .012 | .006 | 33.33 |
| 9 | 1000 | 8 | .030 | 44 | .017 | .014 | .003 | 17.65 |
| 10 | 1000 | 4 | .027 | 80 | .015 | .015 | 0 | 0 |

TABLE I B

| Heat Number | Heat Weight (lbs) | Alloy Addition Rate (lbs/ton) | Ce in Ingot (%) | Ce Recovered (%) | S Before Addition (%) | S in Ingot (%) | S Decrease (%) | Total Change in S (%) |
| --- | --- | --- | --- | --- | --- | --- | --- | --- |
| 11 | 70 | 4 | .018 | 53 | .013 | .010 | .003 | 23.08 |
| 12 | 70 | 7 | .018 | 29 | .013 | .012 | .001 | 7.69 |
| 13 | 70 | 8 | .022 | 31 | .013 | .007 | .006 | 46.15 |
| 14 | 70 | 10 | .021 | 24 | .013 | .008 | .005 | 38.46 |
| 15 | 70 | 10 | .024 | 27 | .013 | .007 | .006 | 46.15 |
| COMPARATIVE HEATS | | | | | | | | |
| 16 | 70 | 4 | .020 | 74 | .010 | .008 | .002 | 20.00 |
| 17 | 70 | 7 | .018 | 44 | .010 | .011 | (.001)* | (1.00)* |
| 18 | 70 | 10 | .012 | 17.4 | .010 | .010 | 0 | 0 |
| 19 | 70 | 13 | .027 | 33 | .010 | .010 | 0 | 0 |
| 20 | 70 | 16 | .041 | 37 | .010 | .007 | .003 | 30.00 |

*Increase

What is claimed is:

1. A rare earth metal silicide alloy comprising about 25 to about 40% rare earth metals, about 35 to about 50% Si, about 5 to about 25% Fe, about 2 to about 8% Ca, about 2 to about 4% Ba and about 1 to about 3% Sr, the proportions based on the weight of the alloy.

2. The rare earth metal silicide alloy of claim 1 comprising about 32.5% rare earth metals, about 42.5% Si, about 15% Fe, about 5% Ca, about 3% Ba and about 2% Sr.

3. The rare earth silicide alloy of claim 1 wherein the ratio of rare earth metals to alkaline earth metals is about 3:1 to about 4:1.

4. A method for producing rare earth metal silicide alloys which comprises carbothermically reducing agglomerated rare earth metal compounds, silica and iron at temperatures in excess of about 3500° F. in which said components are combined so that the resultant rare earth metal silicide alloys comprise about 25 to about 40% rare earth metals, about 35 to about 50% Si, about 5 to about 25% Fe, about 2 to about 8% Ca, aboout 2 to about 4% Ba and about 1 to about 3%, Sr, the proportions based on the weight of the alloys, the ratio of silica to iron present in the reduction process being from about 8:1 to about 12:1, and the amount of carbon present in the reduction process being in excess of the stoichiometric quantity required for reduction of the rare earth metal oxides, other metal oxides in the rare earth metal compounds and the silica present in the reduction process.

5. The method of claim 4 wherein the ratio of silica to iron present in the carbothermic reduction process is about 10:1.

6. The process of claim 4 wherein the rare earth metal silicide alloy produced comprises about 32.5% rare earth metals, about 42.5% Si, about 15% Fe, about 5% Ca, about 3% Ba and about 2% Sr, and the ratio of rare earth metals to alkaline earth metals is about 3:1 to about 4:1.

7. A method for treatment of HSLA steels which comprises treating molten HSLA steels with a sufficient quantity of a rare earth metal silicide alloy comprising about 25 to about 40% rare earth metals, about 35 to about 50% Si, about 5 to about 25% Fe, about 2 to about 8% Ca, about 2 to about 4% Ba and about 1 to about 3% Sr, the proportions based on the weight of the alloy, to produce a HSLA steel having a residual rare earth metal to sulfur ratio of about 1.

8. The method of claim 8 wherein the HSLA steels are treated with a rare earth metal silicide alloy comprising about 32.5% rare earth metals, about 42.5% Si, about 15% Fe, about 5% Ca, about 3% Ba, and about 2% Sr.

* * * * *